Feb. 26, 1963 C. W. BOLLUM, SR 3,078,939
EARTH-SKIMMING AIR VEHICLE
Filed Dec. 16, 1959 6 Sheets-Sheet 6
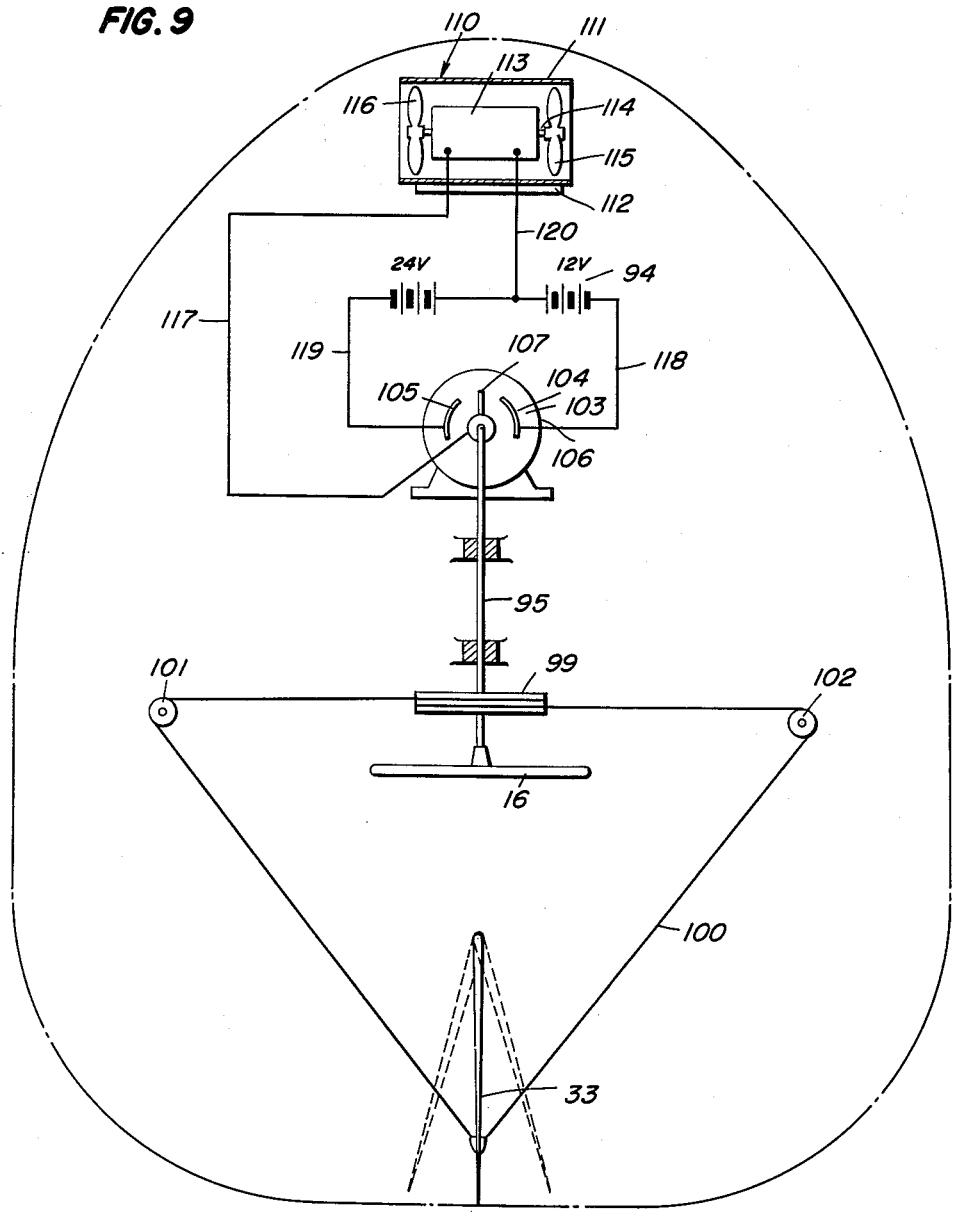
INVENTOR
Carl W. Bollum, Sr.
BY
ATTORNEY 3,078,939
EARTH-SKIMMING AIR VEHICLE
Carl W. Bollum, Sr., Bethesda, Md., assignor, by mesne assignments, to Carwil Enterprises, Incorporated, Daytona Beach, Fla., a corporation of Florida
Filed Dec. 16, 1959, Ser. No. 859,910
3 Claims. (Cl. 180—7)

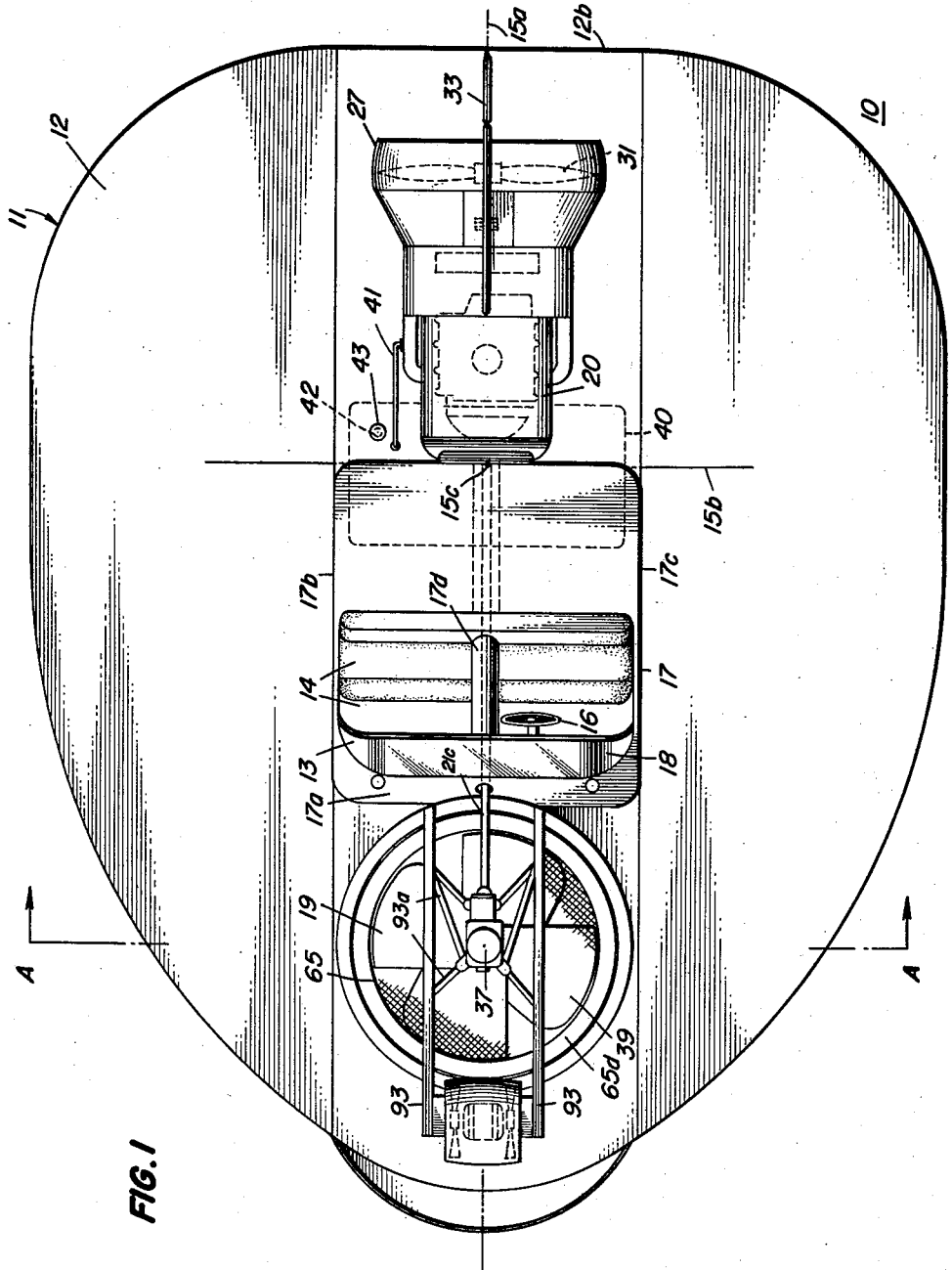

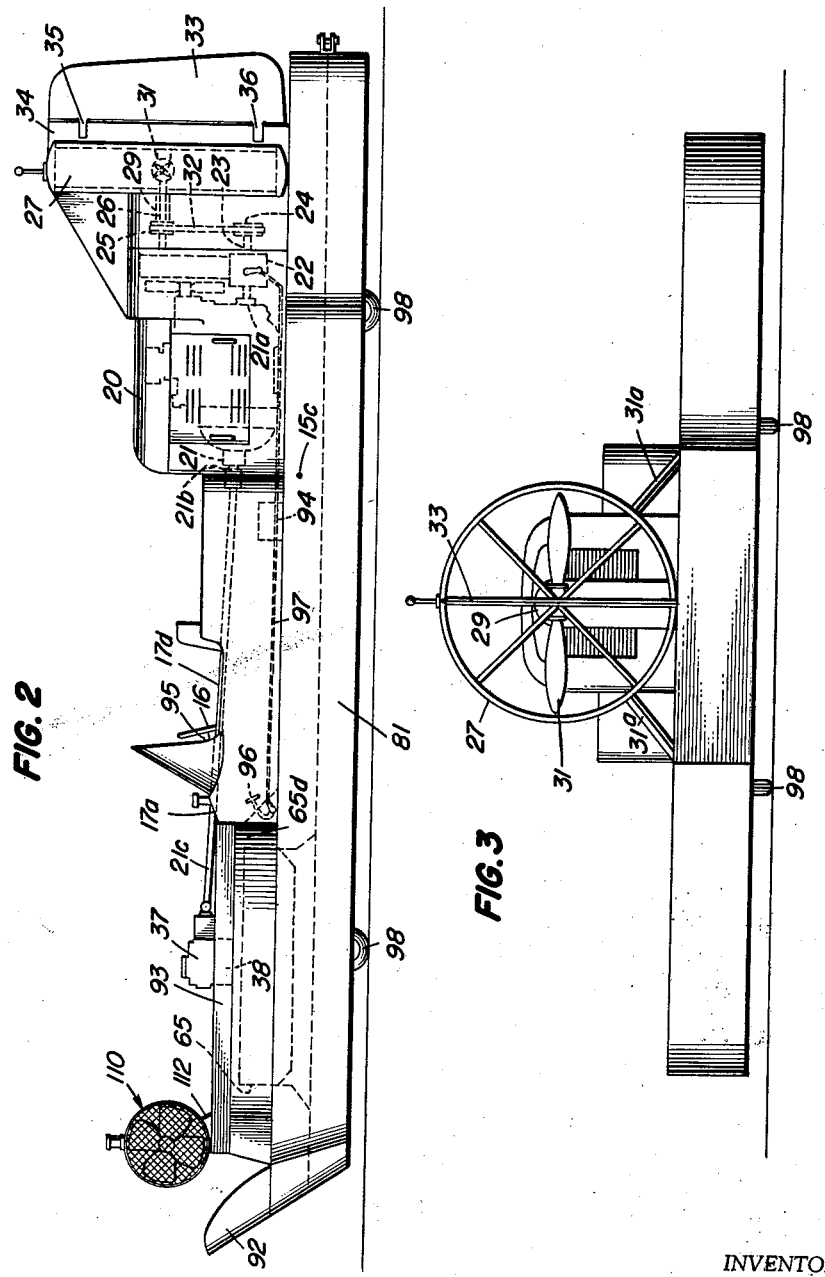

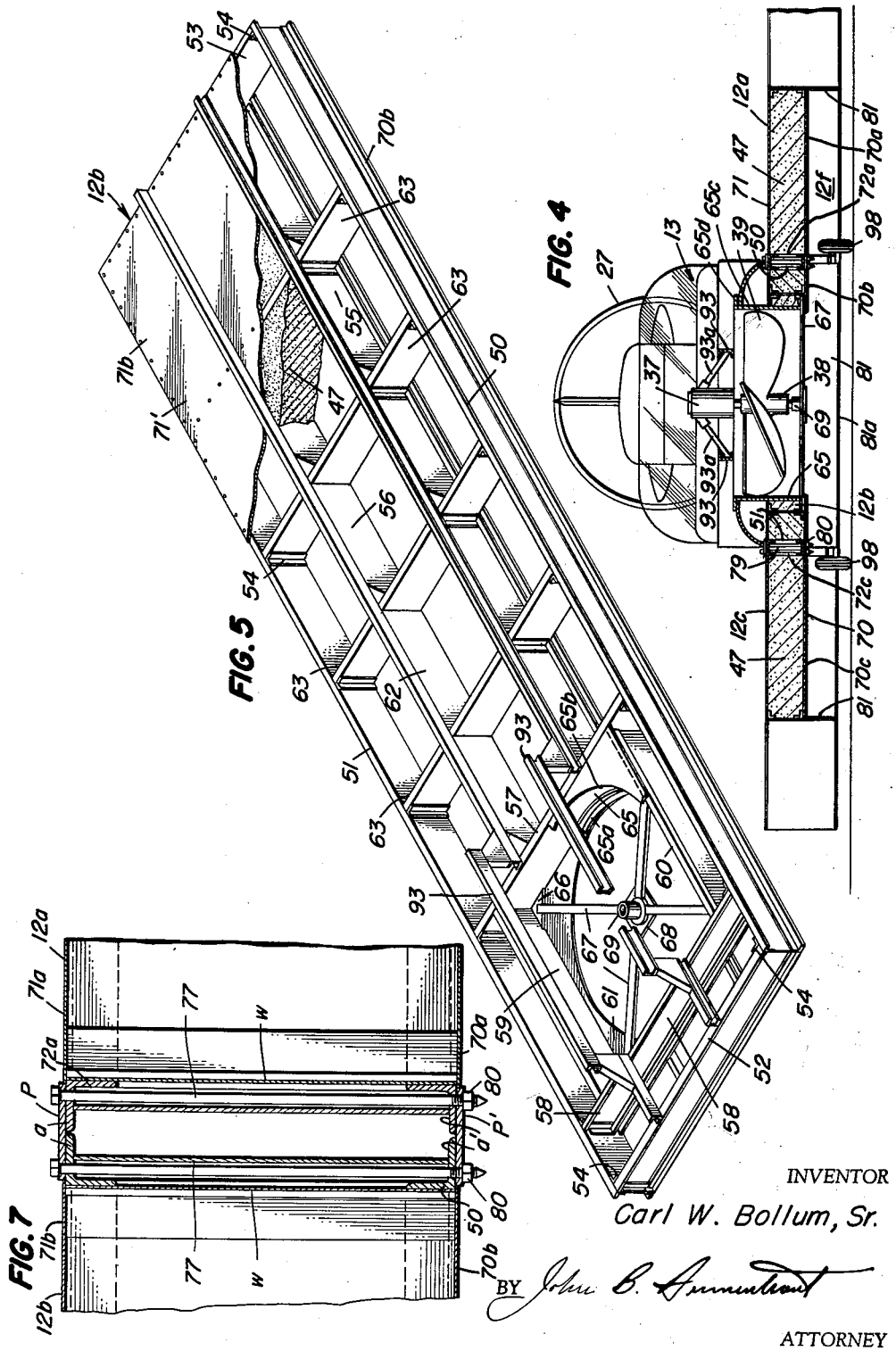

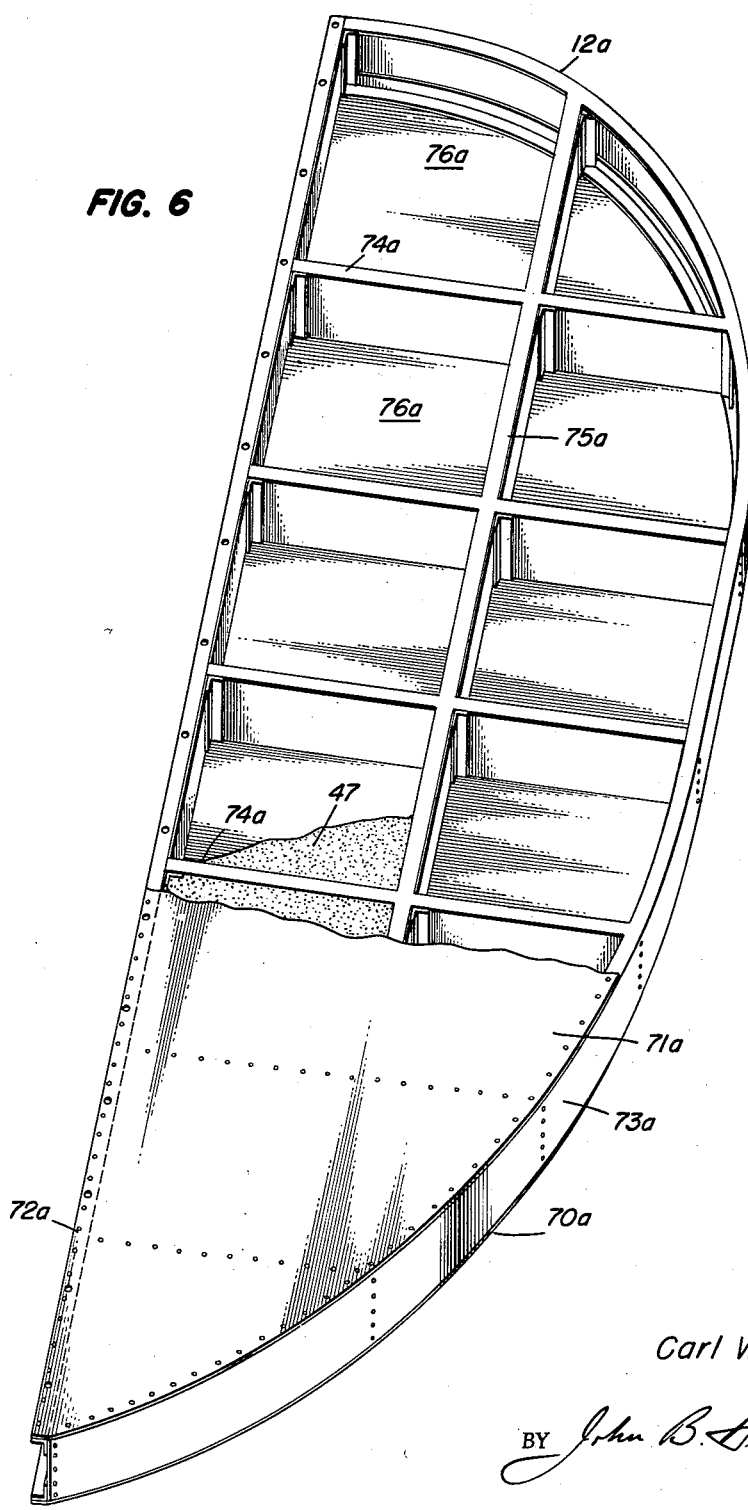

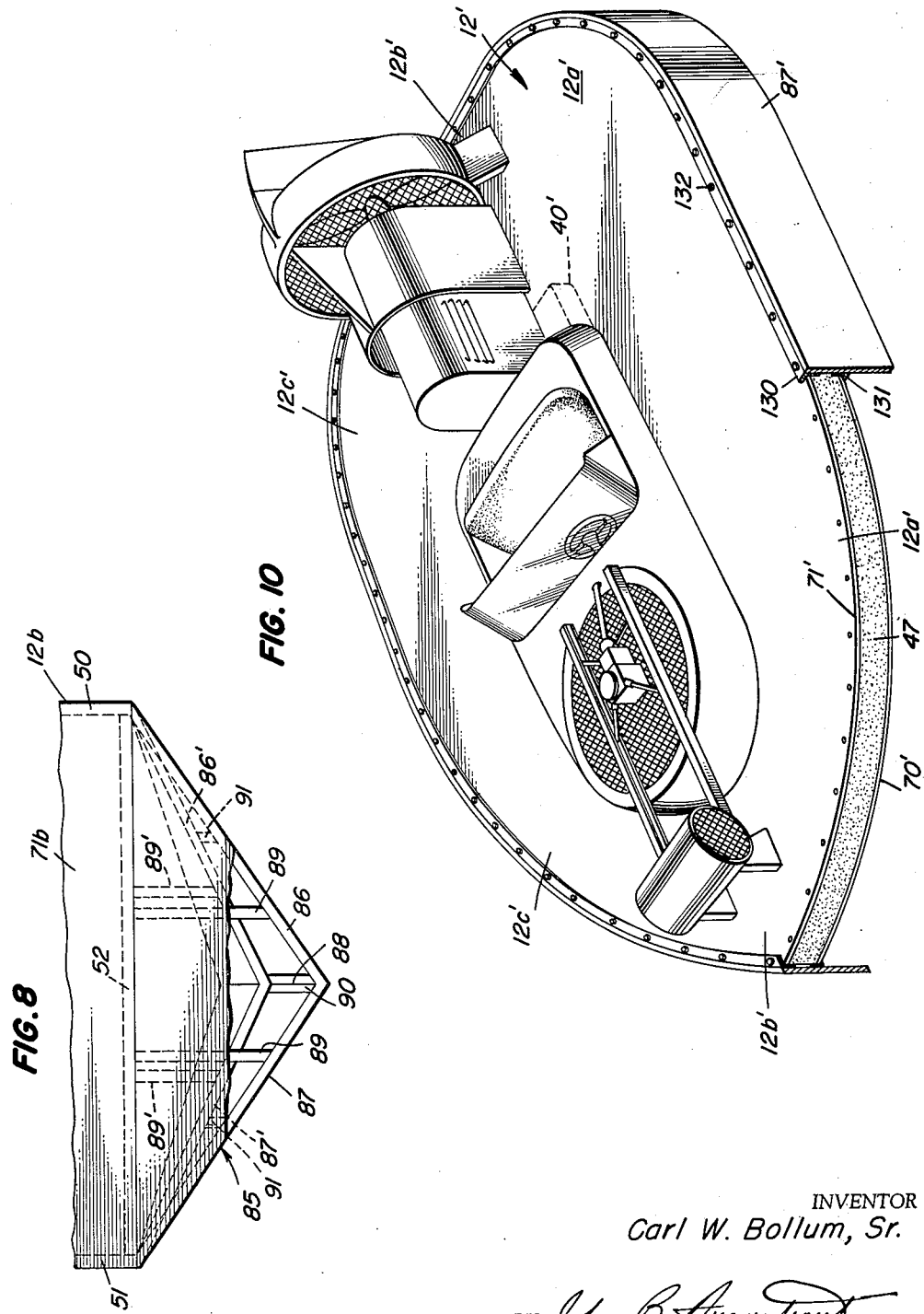

This invention relates to earth-skimming air vehicles and more particularly to vehicles which are operative to raise themselves from a surface by gas pressure and travel above that surface on the gas that is supplied to produce the lift gap.

An object of the present invention is the provision of a powerful, gas pressure sustained air vehicle having a body including a platform which is reliably strong yet is light in weight, the top area of the platform affording floor space for a pilot and other load which may be carried while the vehicle is in use, and which vehicle is provided with power lift means capable of being operated to deliver gas into a plenum or compression chamber having the underneath side of the platform for a ceiling, the ceiling being within the boundary of a skirt carried by the platform adjacent to the outer edge of the platform for the gas to exert pressure upward and lift the vehicle and load off the surface of the earth for travel at low elevations while thus lifted, and which vehicle has steering and propulsion means to achieve guided travel while sustained off the earth by the pressure of the gas acting under the platform.

A further object of this invention is the provision of a gas pressure lifted platform vehicle of the character indicated in which the ceiling of the plenum chamber against which the pressure of the gas acts in its lifting function is a substantially horizontal surface under normal conditions of use of the vehicle, and the ceiling extends substantially all the way to the outer edge of the platform within the boundary afforded by the skirt of the plenum chamber, thus giving a large area upon which the lifting pressure is exerted.

Another object of the invention is to provide a gas pressure lifted platform vehicle of the character indicated in which the top or deck surface of the platform is substantially parallel to the ceiling of the plenum chamber.

Another object of the invention is the provision of a gas pressure sustained air vehicle having a body in which a strong, rigid platform reliably provides buoyancy and safely maintains the vehicle afloat when in aquatic contact, and which platform is well suited for the craft to be lifted above the earth by gas pressure exerted on the underneath side of the platform without imposing excessive power demands on the lift-producing equipment on board.

Another object of this invention is to provide a vehicle of the character indicated in which the ceiling area of the plenum chamber is so related to the platform and to the vehicle as a whole that the floor of the platform will be substantially level when the vehicle is hovering or traveling over a substantially level surface of the earth on the blanket of gas, or is afloat on a quiescent body of water.

Another object of this invention is the provision of a strong and durable gas pressure lifted platform vehicle in which the platform is reliably buoyant when on water and includes an intermediate platform portion and opposite platform portions winged-off the intermediate portion, the winged-off portions themselves being buoyant on water to contribute stability to the intermediate platform portion when the vehicle is in aquatic contact, which vehicle, with the aid of a skirt forming a plenum chamber with the under side of the platform, has the under sides of the winged-off portions contributing ceiling area to the plenum chamber and is capable of achieving lift and travel on a self-supplied blanket of gas serving as a separating pressure layer between the surface of the earth and the underneath side of the platform, and which vehicle when thus supported can travel from place to place along the surface of the earth.

Another object of this invention is the provision of a gas pressure lifted platform vehicle of the character indicated in which the intermediate portion of the platform carries lift equipment, steering control and propulsion equipment, and provides seating for at least one occupant.

Another object of the present invention is to provide a skirted platform vehicle having power lift means and propulsion means driven by a single motor in a very satisfactory and highly reliable drive relation, which vehicle is stably and powerfully sustained in the air within a range of quite low elevations above the surface of the earth by the lift means developing a blanket of air producing lifting pressure against the underneath side of the platform, and which vehicle is made to travel along the surface of the earth under the driving effect of the propulsion means while the vehicle is sustained airborne.

Other objects in part will be obvious and in part pointed out more fully hereinafter.

In the accompanying drawing forming a part of the specification, in which like characters of reference designate like components in the several views:

FIGURE 1 is a top plan view of a vehicle embodying my invention;

FIGURES 2 and 3 respectively are side and rear elevations of the vehicle corresponding to FIGURE 1;

FIGURE 4 is a transverse sectional elevation of the vehicle along line A—A in FIGURE 1;

FIGURE 5 is a perspective view of an intermediate section of the platform of the vehicle represented in the preceding figures, which view is partially broken away to illustrate a filling employed for reinforcement and buoyancy and a portion of the filling is omitted to illustrate frame structure;

FIGURE 6 is a perspective view partially broken away in the manner of FIGURE 5 and representing one of the side platform sections of the vehicle body;

FIGURE 7 is a transverse cross section detail representing structure of frame components used in the vehicle platform;

FIGURE 8 is a detail view of the bow of the vehicle and related skirt structure;

FIGURE 9 is a schematic representation of steering mechanism of the vehicle; and FIGURE 10 represents in perspective view a modified embodiment involving structure of the vehicle platform.

In accordance wtih the practice of the present invention, a hydro-air vehicle 10 is provided having a body 11 which includes a platform 12 of substantial horizontal dimensions. Inboard along the fore and aft center line 15a of the vehicle platform is a cockpit 13 having seats 14 to accommodate four persons. Two of the seats are on one side of the longitudinal center line of the platform and the other two seats are on the opposite side of the same center line. One of the seats is for the pilot. The vehicle has a steering wheel 16 associated with the latter seat for the pilot to control the vehicle. The housing 17 of the cockpit includes a cowl 17a and side walls 17b and 17c on opposite sides of the seats and extending rearwardly of the rearmost seats of the cockpit. Behind the seats the housing spans upper portions of the opposite side walls and forms a space with the pltaform above the floor of the platform. The platform floor is available inside the cockpit for cockpit floor area. A windshield 18 extends laterally of the vehicle and upward from the cowl to protect the occupants when the vehicle is traveling in a forward direction.

Lift gas pressure generating means provided on board the vehicle in the present embodiment includes an air lift pump 19 and a driving motor 20 for the pump. The pump and motor are disposed in tandem with the cockpit and are mounted in positions on the platform respectively forward and aft of the cockpit 13. Motor 20 and the cockpit respectively are grouped around the center of gravity 15c of the platform and are aft and forward respectively of the transverse center line 15b of the platform. The motor has its drive shaft 21 extending in a fore and aft direction approximately over the (see FIGURE 2) longitudinal center line of the platform. As shown, aft end 21a of the motor drive shaft is controlled by a clutch 22 so that the drive shaft can be selectively coupled and disengaged relative to a power take-off shaft 23 onto which a drive pulley 24 is keyed. A horizontal thrust propulsion means including a screw propeller 31 is mounted on the platform 12 aft of the motor 20. The propeller 31 is adapted to produce horizontal thrust for driving the vehicle 10 in a forward direction and has a shaft 26 that is journaled in bearing 29 which is connected to a shroud ring 27 surrounding the propeller, and the shroud ring is supported by struts 31a interconnecting the ring with the vehicle platform. Shaft 26 of the propeller is situated parallel to the floor of the vehicle platform and has its axis parallel to the longitudinal center line of the craft while for example being situated directly above that center line. A pulley 25 is keyed to the propeller shaft and is driven by means of a belt 32 which also engages the drive pulley 24 on the power take-off shaft.

A rudder 33 is provided in the vehicle 10 for yaw control and the rudder is pivotally connected to a vertical support 34 suitably mounted to the vehicle platform immediately aft of the horizontal thrust propeller and its shroud. The axis of the rudder pivots 35 and 36, being vertical, advantageously lies in the same plane as the substantially horizontal axis of the thrust propeller shaft and is aligned fore and aft with the vertical diameter of the shroud ring.

The forward end 21b of the drive shaft of the vehicle motor has an extension drive shaft 21c connected to the input side of an L-gear box 37. The extension drive shaft passes through the housing of the cockpit rearward of the seats of the vehicle, thence through a sleeve 17d of the housing between forward and aft pairs of the seats in the cockpit, then underneath the cowl, and is connected forward of the cowl into the gear box. The output shaft 38 of this gear box carries in driven relation a four-blade rotor 39 of the air pump 19.

A fuel tank 40 is provided for the motor 20 and for this purpose is conveniently housed by the vehicle platform. A fuel line 41 leads from the fuel tank to the motor and also the tank has a fill pipe 42 which is covered by closure cap 43 accessible from the top side of the platform. This fuel tank preferably is in the immediate vicinity of the center of gravity 15c of the platform and is disposed behind the cockpit seats and forward of the motor 20 for good weight distribution and to introduce proximity of the tank to the motor thus reducing the length of fuel line needed.

As will be appreciated more fully hereinafter, the weight of the platform itself is well distributed throughout the entire platform to promote good balance. Weight of any substantial consequence which through variance could upset the balance of the vehicle 10, advantageously is kept near the center of gravity of the platform. Variations in the passenger load in the cockpit and the weight of the cockpit itself, counting that of the seats, thus are better tolerated in the vehicle by positioning the cockpit well inboard and proximate to the center of gravity of the platform. For similar reasons, the fuel tank advantageously is installed near the center of gravity of the platform and thus need for counterbalancing is substantially avoided. Motor 20, in having its weight applied to the platform near the center of gravity of the latter, further serves to keep the center of gravity of the vehicle in the same vicinity inboard as the center of gravity of the platform, as preferred.

Platform 12 is symmetrical with respect to its fore and aft center line and is wider off the vicinity where weight of the vehicle is concentrated along the longitudinal center line of the platform and has a reduced width forward approaching the forward end and a reduced width rearward approaching the aft end where the weight is less concentrated. When the vehicle platform thus is viewed in plan, there are relatively wide portions of the platform lying on opposite sides of the cockpit 13 and driving motor 20 and relatively narrow portions on opposite sides of the air pump 19 and horizontal thrust propeller 30. The resultant or total vertical force component of the pressure of gas employed in the compression chamber for lifting the vehicle 10 acts upward in the vicinity of a line normal to the platform through the center of gravity of the vehicle.

The floor or top surface of the vehicle platform is substantially parallel to the under surface of the platform and space afforded by openings in a lattice-work frame of the vehicle platform between the floor and under surface is filled by low density material 47 for strength, and for buoying the vehicle 10 on water, which material has its voids closed against absorbing water so that the craft may easily ascend for hovering or travel in the air without the impairment of being waterlogged. The filling for example may be a low density water-repellent substance, such as resin foam, in which the voids or cells are closed, which substance will effectively provide buoyancy and exclude water by stably maintaining its closed cellular structure in the presence of water. The filling achieved between the floor and under surface of the platform through the use of the low density material eliminates space which otherwise could through leaks receive appreciable amounts of water, with the water unduly adding to the vehicle load or hurtfully affecting stability when the vehicle is gas pressure sustained or is about to rise in accordance with the available lift capabilities from a body of water on which a landing has been made.

In the present embodiment the intermediate portion of the vehicle platform 12 (see FIGURE 5) takes the form of an intermediate platform section 12b having generally rectangular configuration. A frame work of the intermediate section includes two outer longitudinal frame components 50 and 51. The outer longitudinal frame components are interconnected at their opposite ends by outer transverse frame components 52 and 53, there being vertical angle members 54 riveted to the outside frame components to effect interconnection of these components. Inner spaced longitudinal frame components 55 and 56 extend generally parallel to the outer frame components 50 and 51. The forward ends of the inner longitudinal frame components are disposed a considerable distance aft and are joined by a transverse inner frame component 57 terminating just inside the opposite outside longitudinal frame components. Vertical angle members of the type previously referred to are riveted in place to connect the ends of the inner longitudinal frame components to the transverse member 57 and the ends of the transverse member to the outside longitudinal frame components.

Near the forward end of the intermediate section of the platform and also in the frame work thereof is a transverse inside frame component 58 extending generally parallel to transverse frame component 57 and having its opposite ends connected by means of angle members and rivets to the outer longitudinal frame components. Transverse member 58 forms at least one cell with the longitudinal outside frame members 50 and 51 and transverse outside frame member 52. Extending between transverse members 57 and 58 and longitudinally of the frame are inside members 59 and 60 which form a rectangular opening 61 through the frame of the intermediate platform section 12b. Members 59 and 60 have their opposite ends secured to transverse members 57 and 58 by means of vertical angle members and rivet fastenings. The short longitudinal members 59 and 60 form at least one cell each with transverse members 57 and 58 and the corresponding one of the outside longitudinal frame members 50 and 51. Toward the aft end of the intermediate platform section, and lying between inner transverse member 57 and outer transverse member 58, are a plurality of cells 62 which are delineated by a plurality of spaced series of short transverse inner frame components 63. Some of the short transverse frame components 63 have their opposite ends secured to corresponding one of inner longitudinal frame components 55 and 56 and to a corresponding one of the outer longitudinal frame components 50 and 51 by means of vertical angle pieces which are riveted in place, while others of the short transverse frame components 63 have their opposite ends secured to the opposite sides of the inner longitudinal frame members 55 and 56 again by vertical angle members which are riveted in place to the side to form the proper joints. To lighten the weight of the frame of the intermediate platform sections the longitudinal and transverse components of the frame, already described, advantageously are made of aluminum or other suitable lightweight metal and include a thin gauge sheet metal web $w$ (see FIGURE 7) which is interconnected as by welding to top and bottom angle members $a$ and $a'$ having their one legs vertical and their other legs horizontal so as to produce an overall channel cross section including the sheet material in the section.

The longitudinal and transverse components of the section 12b afford top and bottom surfaces which advantageously are in the same respective planes, the planes being parallel. The rectangular opening 61 receives an air duct 65 (see FIGURE 4) such as of aluminum which extends through the intermediate platform section and the air duct at its lower end is welded to a frame ring 65a that has bottom surface flush with the bottom of the frame work of the section. This frame ring has its outer circumferential edge welded to inner longitudinal frame members 59 and 60 and to inner transverse frame members 57 and 58 (see FIGURE 5) at points of tangency. The four inside corners of the rectangular opening 61 in the frame work accommodate angle plates 66 which are welded in place to the adjacent frame members and these plates individually support arms 67 extending on the diagonals of the opening through apertures in the duct wall and which apertures conform in dimension to the outside dimensions of the arms. At inner ends, the arms are connected to a plate 68 which in turn supports a tubular thrust bearing 69 for the vertical shaft of the impeller of lift pump 19. The outer ends of the arms are suitably secured to the respective plates 66.

The wall of air duct 65 forms cells with the adjacent sides of the longitudinal and transverse members in the rectangular opening and these cells in lattice with the other cells hereinbefore described as existing between longitudinal and transverse members of the frame are filled with the water excluding material. For example, Styrofoam batts are cut to appropriate sizes to fill roughly the cell spaces. The frame work is for example two feet thick and by purchasing foam resin batts having a two foot dimension it is only necessary to cut this material to the general shape of the cell and insert it into the cell. The remaining space between the sides of the cell and the section of batting inserted thereafter is filled with a cementing agent such as a like resin which is applied as a liquid and foamed in situ. This serves to bond the resin in each cell to the side walls of the cell and in the operation the top and bottom surfaces of the resin filling is kept flush with the top and bottom surfaces of the frame work.

The operation of filling the frame with the cellular material is repeated for each cell until all of the cells and spaces in the frame are filled exclusive of the cylindrical opening afforded by the duct itself. One of the cells toward the aft end of the platform section and lying on the longitudinal fore and aft center line of the section is made to receive tank 40 for holding the supply of fuel for motor 20. The introduction of the tank in the cell involves embedding the tank in the filling material and filling the cell around the tank with the resin, at the same time allowing the fuel line 41 and fill pipe 42 of the tank to project upwardly beyond the surface of the top of the frame. Either before or after these operations of filling the frame work are accomplished, a cover sheet 70b forming the underneath side of the intermediate platform section may be applied to the frame work such as by riveting to the longitudinal and transverse components of the frame. The sheet covering is extended over the lower frame ring 65a of the duct 65 and is affixed to that ring by riveting or the like, leaving uncovered only the exit opening of the duct on the under face of the platform section. The sheet material 70b accordingly provides the bottom surface area of the platform section. If the cover sheet material on the bottom is put in place prior to the introduction of the resin filling in the cells, it is preferred to employ a bonding agent on the inside surface of the cover sheet so that the sheet will be integrally bonded to the resin filling in the cells for rigidity and support. It is also preferred in the event that the bottom cover sheet is put in place after filling the cells with resin that a bonding material be employed between the bottom surface of the resin and the inside surface of the cover sheet in putting the cover sheet in place, again to lend reinforcement and strength and to integrate thoroughly the various components of the platform section.

An upper portion of air duct 65 is surrounded by a welded-on frame ring 65b (see FIGURE 4) which has its upper surface in the plane of the top surface of the frame work of the intermediate section and welded at points of tangency to the inner longitudinal frame members 59 and 60 and to the inner transverse frame members 57 and 58. Following the introduction of the closed cellular filling material in the cells of the frame work and bringing that filling substantially flush with the top surfaces of the frame work, a sheet metal cover 71b is introduced to afford floor or deck surface of the intermediate platform section. This covering is riveted to the top members of the longitudinal and transverse frame components and is riveted to the top frame ring 65b at duct 65. In putting down the floor or deck sheet, a bonding agent advantageously is employed to bond the inside surface of the sheet to the filling material in the cells, thus integrating the structure.

Winged-off portions of the vehicle platform in the present embodiment include two side platform sections 12a and 12c (see FIGURE 4) which are winged-off the intermediate platform section 12b. It will be understood that the side platform sections are right hand and left hand counterparts. The ensuing description accordingly is directed to left hand side platform section 12a and will not be repeated for the other side platform section 12c for it can readily be visualized that the counterpart is the same except for being reversed for the right hand side position. Platform section 12a (see FIGURE 6) includes a straight outer longitudinal frame component 72a having its opposite ends connected as by means of vertical angle members and rivets to a bowed outer frame component 73a giving an outside frame which is substantially of D-configuration. Inside transverse frame components 74a are substantially normal to outer frame component 72a and extend from the latter component in spaced generally parallel relation to each other. The ends of the transverse inside components are connected respectively to the straight frame member 72a and the bowed frame member 73a as by means of vertical angle members and rivet connectors. At least one set of short aligned longitudinal inside frame components 75a extend parallel to the outer straight frame 72a and are disposed between the inside transverse members and the bowed outer frame component. The corresponding ends of these short longitudinal frame components are secured to the outer frame and to the inside transverse members by vertical angle elements which are riveted in place to produce the connections. Thus, the inside longitudinal and transverse frame components of the platform section 12a provide cells 76a with each other and with the outer straight longitudinal frame member and the bowed outer frame member. The various inside and outer components of the frame advantageously include upper and lower angle members a and a' having their one legs vertical and their other legs horizontal in accordance with FIGURE 7. A relatively thin gauge strip of metal w joins the vertical legs of the top and bottom angle members of each frame component and the horizontal legs of the angle members form a channel with the corresponding sheet metal strip. The substantially horizontal legs of the outer frame component extend outward while for reasons which will be explained more fully hereinafter the horizontal legs of the angle members in the bowed outer frame component of the platform section extend inward of the section. The top surfaces of the upper angle members of the outer frame components advantageously lie in the same plane as the top surfaces of the upper angle members in the inner transverse and longitudinal frame members and likewise the bottom surfaces of lower angle members of the outer frame components lie in the same plane as the top surfaces of the lower angle members in the inner longitudinal and transverse frame components. All of the cells in platform section 12a are filled with a low density water-repellent material 47 having voids which are closed, to impart buoyancy and the filling preferably is integrally bonded with the side walls of the cells and brought flush to the top and bottom surfaces of the frame work of the section. A top cover sheet 71a is applied by riveting to the upper angle members of the inner and outer components of the frame, thus producing floor or deck surface of the vehicle platform, and a bottom cover sheet 70a is secured to the bottom angle members of the inside and outer components of the frame by riveting to provide under surface of the platform. The top and bottom cover sheets advantageously are bonded to the filling material employed in the cells of the frame work thus to lend rigidity and in effect to form an integral slab including the sheet material.

The longitudinal outside fore and aft members 50 and 51 of the intermediate platform section and the straight outer frame components of the side sections 72a and 72c (see FIGURES 4 and 7) have apertures through the top and bottom angle members thereof. The top and bottom apertures are aligned vertically in each of the frame components of the platform sections and extend through the top and bottom cover sheets of the particular platform section to admit fastening bolts 77. The bolts also pass through corresponding apertures in top and bottom tie plates P and P' overlapping a corresponding one of the side sections and the corresponding outside longitudinal frame component of the intermediate platform section. The shanks of the bolts are threaded and receive fastening nuts 80 which accordingly maintain the platform sections rigidly interconnected.

The aft end of the intermediate platform section 12b supports a skirt 81 which also extends around the bowed outside edge of each of the side platform sections 12a and 12c. This skirt is fastened in place by rivets which are set at appropriate intervals through the skirt and through the top and bottom angle members of the outer frame components of the sections just mentioned. The skirt preferably is of sheet material such as aluminum and extends all the way to the top surface or floor area of the platform and terminates at a lower edge 81a (see FIGURE 4) which is uniformly a distance below the under surface afforded by sheet material 70 of the platform, which distance for example is about equal to the thickness of the platform. The sheet metal of the skirt is of a gauge which will withstand the pressures of the gas employed for lifting the vehicle into the air. Cover sheets 70 and 71 respectively affording the bottom and deck surfaces of the platform illustratively are of aluminum. If desired, the thin gauge sheet web material w heretofore described as being employed between the upper and lower angle members a and a' of the outside components of the platform sections 12a, 12b and 12c, may be omitted in favor of the skirt being directly fastened to those upper and lower angle members if a heavier gauge sheet metal is to be employed in the skirt as compared with lighter gauge webbing w between the angle members of the inner and outer frame components elsewhere in the structure, or if desired the thin gauge webbing may be employed throughout and simply covered by skirt sheeting of suitable gauge.

The forward end of the intermediate platform section has a bow extension 85 (see FIGURE 8) off the generally rectangular frame of the section. The extension includes upper outer frame elements 86 and 87, respectively extending forward off the adjacent upper forward ends of the outer longitudinal frame components 50 and 51 of the intermediate section and having their outer ends joined at the bow tip 88. Short longitudinal floor frame extension members 89 interconnect the forward outside transverse frame component 52 of the intermediate platform section to the respective upper frame components 86 and 87 intermediate the lengths of the latter. The top surfaces of the extension frame components lie in the same plane as the top surfaces of top angle members in the main body of the intermediate platform section 12b and are covered by an extension of deck or floor sheeting 71b suitably secured to the frame components. Similarly, there are lower bow extension frame members 86' and 87' off the lower forward ends of the outer longitudinal frame members 50 and 51 and which extensions intersect at the bow tip 88 beneath and rearwardly of the point of interconnection of the upper frame members 86 and 87. Members 86' and 87' are supported by intermediate longitudinal frame members 89' to the transverse frame component 52 of the platform. A bow tip strut 90 extending upward and forward in the platform body interconnects upper members 86 and 87 with lower members 86' and 87'. These same upper and lower members also are interconnected at intervals along their lengths by spaced struts 91. The lower frame extension members have surfaces in the plane of the bottom surface of the main frame work of the intermediate platform section 12b and are covered by an extension of sheeting 70b. Skirt 81 is continued from the side platform sections 12a and 12c and all the way to the bow tip 90 and is fastened to upper extension members 86 and 87 and lower extension members 86' and 87' of the bow as well as to upwardly and outwardly inclined bow strut 90 and the struts 91. While the skirt is still maintained generally vertical, it inclines backward beneath the under surface of the platform at the bow and has a lower edge which remains in the same general plane as the edge of the skirt at other points around the periphery of the vehicle platform. It will be appreciated that from the bow tip, opposite portions of the skirt adjacent to the opposite sides of the platform 12 diverge from each other such as to facilitate forward movement of the vehicle in the fluid medium in which it is traveling. A cell resulting from the bow extension of the platform may be filled with the buoyancy imparting material previously mentioned. Shield 92 (see FIGURE 2), such as to protect against spray while the vehicle is afloat on water, extends upward from the bow to above deck level of the platform.

The pump air duct 65 (see FIGURES 1, 2, and 4) in the platform 12 of the vehicle has a vertical throat extension 65c upward from floor level of the platform and this throat terminates in a rail 65d. Two parallel longitudinal beams 93 are mounted on the rail and are spaced an equal distance from the longitudinal center line of the platform, each on an opposite side of the line. The four-blade impeller 39 of the air lift pump lies in the air duct below the beams just mentioned (FIGURE 4) and has its shaft 38 vertical. The lower end of the impeller shaft is accommodated in the lower journal bearing 69 carried by the frame work of the intermediate platform section while the upper end of this same shaft is journaled in the housing of the L-gear box 37 which receives drive from the vehicle motor 20 through input shaft 21c. The gear box is situated centrally above the beams 93 and has a plurality of downwardly extending inclined struts 93a connected to these beams for support, whereby the axis of the pump impeller is given a fixed vertical position, and the input drive shaft of the gear box is supported along with the gear box.

When the vehicle 10 is launched on water, the buoyant platform 12 reliably maintains the vehicle afloat while the filling 47 in the cells of the lattice-work platform frame also contributes strength and rigidity to the platform. The skirt immerses all the way to the under surfaces 70a, 70b and 70c of the several sections of the platform, which preferably lie in the same plane with each other. This platform under surface within the boundary afforded by the skirt 81 acts as the ceiling of a gas compression or plenum chamber which has inlet for the lifting gas through the duct 65 in the intermediate section 12b of the platform. Conveniently, the driving motor 20 of the vehicle may be started by the pilot from the cockpit 13 through the use of a vehicle battery 94 on board and a suitable ignition and starter system, not shown. The pilot also has control in the cockpit over the drive of the thrust propeller 31 which propeller may be engaged with the driving motor 20 through the use of a foot treadle 96 and a suitable control linkage 97 to clutch 22. The clutch conveniently is normally disengaged so that the vehicle motor 20 will drive the lift pump 19 to the exclusion of the thrust propeller 31. Under the latter conditions, the pilot may throttle the driving motor by means of throttle control (not shown) extending from the cockpit to the motor 20 and the impeller 39 of the vehicle lift pump draws in air from the environs above the vehicle and delivers this air through duct 65 into the gas compression chamber 12f, see for example FIGURE 4. Pressure of the air, exercised against the surface of platform cover sheet 70 in the chamber, reaches a value which is sufficient to cause the vehicle to rise from the surface of the earth. The lifting pressure of the air in pounds per square inch then exceeds the opposing gross weight of the vehicle in pounds per square inch. The vehicle 10 rises vertically until an equilibrium between these pressures is established. At equilibrium height of the vehicle, the air volume pumped into the plenum chamber 12f and the air volume which escapes from under the lower edge 81a of the skirt are equal. The height of the lower edge of the skirt above the surface from which the vehicle has risen is an earth skimming height, in certain embodiments ranging up to several feet and is substantially a linear function of lift air pumping capability of the vehicle and the load encountered on board. In effect, an air cushion is formed under the vehicle and as the air which is under pressure leaks out below the skirt, the air is replaced in the plenum chamber 12f by the operation of the lift pump 19, and the platform 12 and the remainder of the vehicle are stably airborne. Once this air bearing or cushion has been formed, it takes very little energy to move the vehicle over the surface of the earth. This movement is readily accomplished by means of the aft propeller 31 which at the time desired is engaged through clutch 22 by the pilot from the cockpit. The motor 20 then drives both the lift pump 19 and the thrust propeller 31. With the thrust propeller operating, a forward movement of the vehicle is produced and this movement continues as long as the thrust propeller is maintained in operation. The vehicle accordingly is driven forward under low friction on the sustaining blanket of air. On disengaging the clutch 22, the vehicle 10 will hover so long as the lift pump 19 is driven at a rate to maintain the vehicle airborne. On throttling down the motor 20 the quantity of air delivered under the platform diminishes and gradually a landing may be made back on the water or on land itself. The vehicle 10 has four wheels 98 which are disposed on the under side of the platform such as directly beneath the opposite longitudinal sides of the intermediate platform section such as on carriage frames which are fixed by certain of the bolts 79 and nuts 80 (see FIGURE 4) to the longitudinal outer members of the intermediate frame. Two of the wheels are well forward on the intermediate platform section and are directly opposite each other while the other two wheels are well aft on the intermediate platform section and are directly opposite each other. The wheels project downward far enough to support the entire vehicle above a pavement, or other surface where landings are to be made, and the lower edge of the skirt is maintained a short distance above the landing surface by means of the wheels being in contact with that surface by projecting a short distance below the plane of the lower edge of the skirt. The aft wheels for example have carriage frames including caster mountings, while the forward wheels have their axles fixed transversely of the vehicle against swivelling.

The vehicle steering wheel 16 (see FIGURE 9) has a steering shaft 95 and keyed to the steering shaft is a pulley 99 around which a rudder steering wire 100 is wound several turns in frictional contact. On opposite sides of the steering shaft are guide pulleys 101 and 102 for the wire and these pulleys are suitably mounted to the vehicle body. The wire extends over these guide pulleys and has its opposite ends connected to opposite sides of the rudder 33 of the vehicle under conditions where the wire is held taut and will grip the steering wheel shaft pulley so that the rudder will respond by rotation about its pivot axis in response to rotation of the steering wheel by the pilot. A two-way electric switch 103 having spaced arcuate contacts 104 and 105 fixed in position relative to the vehicle such as through being mounted to the switch housing 106 and the housing connected to the vehicle body. This switch also is equipped with a rotary switch contact 107 intermediate the two fixed arcuate contacts. The rotary contact is mounted on the shaft of the vehicle steering wheel and rotates with that shaft when the steering wheel is turned by the pilot. The gap between the fixed arcuate contacts is bisected by the movable contact when the rudder of the vehicle is brought to a straight ahead course position and from the latter position the steering wheel may be rotated an amount corresponding to a 15 degree left rudder position or a 15 degree right rudder position before the movable contact closes circuit against either of the fixed contacts. Thus, steering of the vehicle by rudder control in the absence of any effect brought about by the switch is permissible within a left hand rudder range and a right hand rudder range of rotation from the straight ahead position of the rudder.

Vehicle 10 includes a side thrust steering device 110 at the forward end of the intermediate platform section 12b to supplement the steering effect of the rudder 33 beyond the 15 degree right and left hand rudder positions. The supplemental device includes an open cylindrical tube 111 which is mounted on a base 112 carried by the forward ends of the parallel beams 93. The axis of the tube 111 is transverse to the longitudinal axis of the vehicle. Mounted to the inside of the tube (see FIG- URE 9) and situated intermediate the opposite ends thereof is a D.C. motor 113 having an armature shaft 114 at the opposite ends of which are bladed impellers 115 and 116 in which the blades of both impellers are pitched in favor of moving air in the same direction through the surrounding tube 111. The motor 113 is in electrical circuit with the reversing switch 103 and with battery 94.

When the steering wheel 16 is turned for left rudder beyond the 15 degree range from dead center, the movable contact 107 of the switch closes circuit against fixed contact 104 and this circuit may be traced from a 12-volt terminal of the battery over lead 120, through electric motor 113, thence along lead 117 to the movable contact, fixed contact 104 and over lead 118 to a zero volt terminal of the battery. The motor 113 accordingly is energized and the steering pump impellers 115 and 116 take in air from the left hand side of the surrounding tube and discharge a blast of air from the right hand side of the tube thus producing a steering thrust which supplements the effect of the rudder in the extreme left hand rudder position then prevailing. A sharper turn accordingly may be accomplished when the vehicle is traveling above the surface of the earth on the blanket of gas which sustains it. Likewise, if the vehicle is merely hovering above the surface of the earth, the steering effect of the rudder at extreme left rudder position may be inadequate; however, the steering pump 110 by delivering its blast of air to the right produces a turning reaction causing the vehicle to heel around to the left and thus the vehicle may be directed in the air while hovering continues. When desired direction is attained, the steering wheel 16 is merely brought back to a position corresponding to dead ahead rudder position.

An opposite steering effect is achieved when the pilot turns the steering wheel to a position exceeding 15 degree right hand rudder position. A circuit then is closed through movable contact 107 and fixed contact 105 which may be traced from a 24-volt terminal of the vehicle battery over lead 119, through fixed contact 105, movable contact 107, lead 117, thence through electric motor 113, along lead 120, back to the 12-volt terminal of the battery. This circuit on being closed causes the motor to reverse as compared with the circuit prevailing under extreme left hand rudder position. The steering impellers take air into the surrounding duct 111 from the right hand end of the duct and discharge it in a blast from the left hand end of the duct. This blast of air drives the vehicle to the right and supplements the steering effect of the rudder which is in right hand rudder position.

It will be seen that by providing vehicles in accordance with this invention which have platforms that are buoyant in water, the vehicles have great value for marine use and usually along with this property readily lend themselves to amphibian use. Even where the vehicles are not to be used on water, a very important advantage nevertheless is obtained through the use of the platform structure including in its body an integrally bonded lightweight filling material which lends reinforcement and strength to the platform. The filling has its presence more than justified through the strength that it contributes to the vehicle structure, for with the use of the material, platform framing may be minimized and lightened, which more than makes up for the gain in weight from the addition of the filling in the platform frame cells.

In a modified embodiment (see FIGURE 10) in accordance with the present invention, the platform 12' of the gas pressure sustained air vehicle is so constructed that sheet metal, sheet resin, marine plywood, or other suitable bottom and top platform coverings 70' and 71' are integrated with an intermediate layer of low density, water-repellent material 47 having closed voids, for buoying the vehicle on water. The intermediate layer 47 is substantially coextensive throughout with the platform coverings in the sense that inside frame components forming a lattice and frame cells are omitted and the loads encountered by the vehicle platform are carried conjointly by the top and bottom platform coverings and the intermediate layer which are secured together such as by being integrally bonded by a cementing agent for the purpose. In certain instances the intermediate portion 12b' of the platform is made integral with the side portions 12a' and 12b' and in other instances the several portions are in the form of individual platform sections which are secured together by suitable connections. Skirt 87' of the vehicle is attached to the outer edge of the platform 12' by suitable connections which for example include top and bottom flanges 130 and 131 on the inside surface of the skirt which overlap the top and bottom surfaces of the platform at the peripheral edge of the platform and are secured in place by bolts 132, and corresponding nuts, through the thickness of the body of the platform. Where a fuel tank 40' or other equipment is to be used in the intermediate layer, a portion of the intermediate layer may be cut out prior to forming the laminate including the two surface layers and then back filled with resin or the like foamed in place to embed and provide continuity of the inner layer except for the addition of the equipment housed.

While considerable emphasis has been placed upon the use of resin foam fillings for buoyancy and strength in the practice of the present invention, it will be distinctly understood that certain advantages still in accordance with the practice of the invention are had through the use of other low density water excluding fillings such as those in which a lightweight waterproof matrix is utilized having voids which for example are afforded through mixing with the matrix an aggregate of hollow closed plastic spheres, thin wall glass spheres which are sealed and hollow inside or even lightweight metal units which are hollow inside and which are hermetically sealed to produce the void spaces, while the matrix achieves bond and transmits reinforcement to the other components of the platform.

As many possible embodiments may be made of this invention and as many possible changes may be made in the embodiments hereinbefore set forth, it will be distinctly understood that all matter described herein is to be interpreted as illustrative and not as a limitation.

I claim:

1. A vehicle adapted to be raised from the surface of water by gas pressure and travel sustained in the air while forming a lift gap with said surface from low altitude, said vehicle comprising a body including a platform having a lift face and a bow, the bow of said platform diverging in width aft substantially symmetrically with respect to the fore and aft center line of the platform and said platform being a buoyant structure to sustain the vehicle afloat by said platform being in contact with the water when the vehicle is brought down on the water, a downwardly extending rigid, water-immersible skirt on the platform contiguous to the perimeter of said lift face and the perimeter of said platform and substantially forming a surround for said lift face and for downwardly open plenum space having said lift face for a ceiling, and said skirt having a bow in which portions of said skirt diverge from each other aft substantially symmetrically with respect to the fore and aft center line of the platform and extend downwardly from the bow of the platform, and a cockpit disposed on the platform along the fore and aft center line of the platform, and means for vertically lifting, horizontally propelling and steering the vehicle, said means including vertical lift and horizontal propulsion means comprising air pump means on the vehicle forward of said cockpit and in communication with said plenum space, a motor on the vehicle aft of the cockpit and having a drive connection with said air pump means for said air pump means to supply gas under pressure to said plenum space and in cushion under said platform for lifting the vehicle, from a position where said skirt is immersed in water and said platform is afloat on the water, upward only in the region of ground effect and supporting the vehicle into a hovering position with said skirt forming with said surface a lift gap which gap under given load on the vehicle has magnitude varying with gas pressure then available in total for lifting the vehicle in view of amounts of gas escaping from said plenum space to the atmosphere, said vertical lift and horizontal propulsion means further comprising horizontal thrust means on the vehicle for the vehicle to propel itself through the air in a forward direction while supply of gas to said plenum space is continued by said air pump means to support said platform with said skirt forming a lift gap with said surface and for said vehicle to propel itself in a forward direction when said platform is afloat on water with said skirt immersed in the water, and said first mentioned means further including steering means on the vehicle for the vehicle to be steered.

2. A vehicle adapted to be raised from the surface of water by gas pressure and travel sustained in the air while forming a lift gap with said surface from low altitude, said vehicle comprising a body including a platform having a bow, a lift face, and a duct having a vertical axis, the bow of said platform diverging in width aft substantially symmetrically with respect to the fore and aft center line of the platform and said platform being a buoyant structure to sustain the vehicle afloat by said platform being in contact with the water when the vehicle is brought down on the water, said duct being in a forward position along the fore and aft center line of the platform, and said body further including a cockpit on said platform aft of said duct, and a downwardly extending rigid, water-immersible skirt on said platform contiguous to the perimeter of said lift face and the perimeter of said platform and substantially forming a surround for said lift face and for downwardly open plenum space having said lift face for a ceiling, and said skirt having a bow in which portions of said skirt diverge from each other aft substantially symmetrically with respect to the fore and aft center line of the platform and extend downwardly from the bow of the platform, and means for vertically lifting, horizontally propelling and steering the vehicle, said means including vertical lift and horizontal propulsion means comprising an air impeller disposed inside said vertically extending duct and rotatably mounted on said platform to rotate on a vertical axis substantially coaxial with said duct for moving air through said duct into said plenum space, a motor on the vehicle aft of said cockpit and having drive connection with said impeller for rotating the impeller for said impeller to supply air under pressure to said plenum space and in cushion under said platform for lifting the vehicle, from a position where said skirt is immersed in water and said platform is afloat on the water, upward only in the region of ground effect and supporting the vehicle into a hovering position with said skirt forming with said surface a lift gap which under given load on the vehicle has magnitude varying with gas pressure then available in total for lifting the vehicle in view of amounts of gas escaping from said plenum space to the atmosphere, and said vertical lift and horizontal propulsion means further comprising horizontal thrust means on the vehicle for the vehicle to propel itself through the air in a forward direction while supply of gas to said plenum space is continued by said air impeller to support said platform with said skirt forming a lift gap with said surface and for the vehicle to propel itself in a forward direction when said platform is afloat on water with said skirt immersed in the water, and said first mentioned means further including steering means on the vehicle for the vehicle to be steered.

3. A vehicle adapted to be raised from the surface of water by gas pressure and travel sustained in the air while forming a lift gap with said surface from low altitude, said vehicle comprising a body including a platform having a bow, a lift face, and a duct having a vertical axis, the bow of said platform diverging in width aft substantially symmetrically with respect to the fore and aft center line of the platform and said platform being a buoyant structure to sustain the vehicle afloat by said platform being in contact with the water when the vehicle is brought down on the water, said duct being in a forward position along the fore and aft center line of the platform, and said body further including a cockpit on said platform aft of said duct, and a downwardly extending rigid, water-immersible skirt on said platform contiguous to the perimeter of said lift face and the perimeter of said platform and substantially forming a surround for said lift face and for downwardly open plenum space having said lift face for a ceiling, and said skirt having a bow in which portions of the skirt diverge from each other aft substantially symmetrically with respect to the fore and aft center line of the platform and extend downwardly from the bow of the platform, and means for vertically lifting, horizontally propelling and steering the vehicle, said means including vertical lift and horizontal propulsion means comprising an air impeller disposed inside said vertically extending duct and rotatably mounted on said platform to rotate on a vertical axis substantially coaxial with said duct for moving air through said duct into said plenum space, a motor on the vehicle aft of said cockpit and having drive connection with said impeller for rotating the impeller for said impeller to supply air under pressure to said plenum space and in cushion under said platform for lifting the vehicle, from a position where said skirt is immersed in water and said platform is afloat on the water, upward only in the region of ground effect and supporting the vehicle into a hovering position with said skirt forming with said surface a lift gap which under given load on the vehicle has magnitude varying with gas pressure then available in total for lifting the vehicle in view of amounts of gas escaping from said plenum space to the atmosphere, and said vertical lift and horizontal propulsion means further comprising horizontal thrust screw propeller means aft on the vehicle and connected with said motor for the vehicle to propel itself through the air in a forward direction under the drive of said motor while supply of gas to said plenum space is continued by operation of said air impeller to support said platform with said skirt forming a lift gap with said surface and for the vehicle to propel itself in a forward direction when said platform is afloat on water with said skirt immersed in the water, and said first mentioned means further including steering means on the vehicle for the vehicle to be steered.

References Cited in the file of this patent

UNITED STATES PATENTS

| | | |
|---|---|---|
| 936,395 | Worthington | Oct. 12, 1909 |
| 2,322,790 | Cristadoro | June 29, 1943 |
| 2,385,889 | Skavinsky | Oct. 2, 1945 |
| 2,751,038 | Acheson | June 19, 1956 |
| 2,875,720 | Hupp | Mar. 3, 1959 |
| 2,880,945 | Crane | Apr. 7, 1959 |
| 2,918,183 | Petersen et al. | Dec. 22, 1959 |

FOREIGN PATENTS

| | | |
|---|---|---|
| 219,133 | Australia | Nov. 24, 1958 |

OTHER REFERENCES

Publication: "Aviation Week," July 6, 1959, pages 115 and 116.

Article appearing the Washington, D.C., "Evening Star," issue of October 9, 1959, page B-8, cols. 1 and 2, entitled "Test 'Flight' Nearing for Air Borne Boat."